United States Patent
Chotoku et al.

(10) Patent No.: US 7,409,565 B2
(45) Date of Patent: Aug. 5, 2008

(54) METHOD, PROGRAM AND APPARATUS FOR POWER CONTROL THROUGH AN ELECTRONIC INFORMATION DEVICE IN A MAGNETIC DISK UNIT

(75) Inventors: Yuji Chotoku, Kawasaki (JP); Takashi Sugawara, Machida (JP); Takashi Yomo, Fujisawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 439 days.

(21) Appl. No.: 11/304,834

(22) Filed: Dec. 15, 2005

(65) Prior Publication Data
US 2006/0136760 A1   Jun. 22, 2006

(51) Int. Cl.
G06F 1/32 (2006.01)
(52) U.S. Cl. .......... 713/300; 713/310; 713/320; 713/321; 713/322; 713/323; 713/324; 713/330; 713/340; 711/4; 711/112; 711/114
(58) Field of Classification Search .......... 713/300, 713/310, 320–324, 330, 340; 711/4, 112, 711/114
See application file for complete search history.

(56) References Cited

U.S. PATENT DOCUMENTS

| 6,052,791 | A  | * | 4/2000  | Chen et al. ............. 713/300 |
| 6,590,730 | B2 | * | 7/2003  | Veltchev et al. ........... 360/69 |
| 6,986,064 | B2 | * | 1/2006  | Yoshimoto et al. ........ 713/300 |
| 7,328,356 | B2 | * | 2/2008  | Igari ..................... 713/320 |
| 2002/0089774 | A1 | * | 7/2002  | Veltchev et al. ........... 360/69 |
| 2005/0235171 | A1 | * | 10/2005 | Igari ..................... 713/323 |
| 2005/0268132 | A1 | * | 12/2005 | Yun et al. ............... 713/323 |
| 2006/0075185 | A1 | * | 4/2006  | Azzarito et al. ........... 711/113 |
| 2006/0191021 | A1 | * | 8/2006  | Jeong et al. .............. 726/29 |

FOREIGN PATENT DOCUMENTS

| JP | 09-006465   | 10/1997 |
| JP | 2004-241093 | 8/2004  |

* cited by examiner

*Primary Examiner*—Abdelmoniem Elamin
(74) *Attorney, Agent, or Firm*—Carlos Munoz-Bustamante; Dillon & Yudell LLP

(57) ABSTRACT

A power control method for a magnetic disk unit is disclosed. The method includes identifying a type of a last instruction sent to a magnetic disk unit and, in response to identifying the type, setting a wait time that varies according to the type. In response to the wait time having elapsed after a completion of processing ordered by the last instruction, an idle instruction is sent to the magnetic disk unit for placing the magnetic disk unit in an idle state in which power consumption is reduced.

20 Claims, 5 Drawing Sheets

[Figure 1]
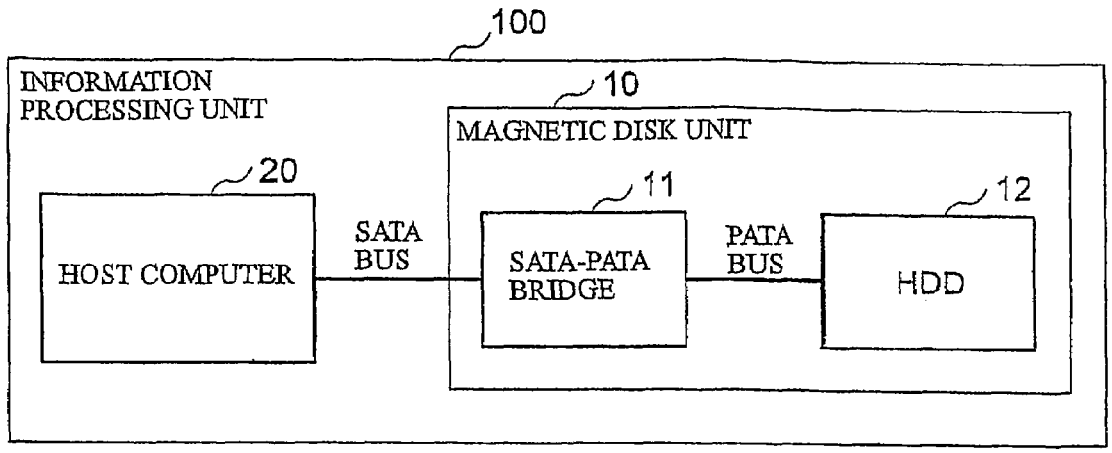
[Figure 2]
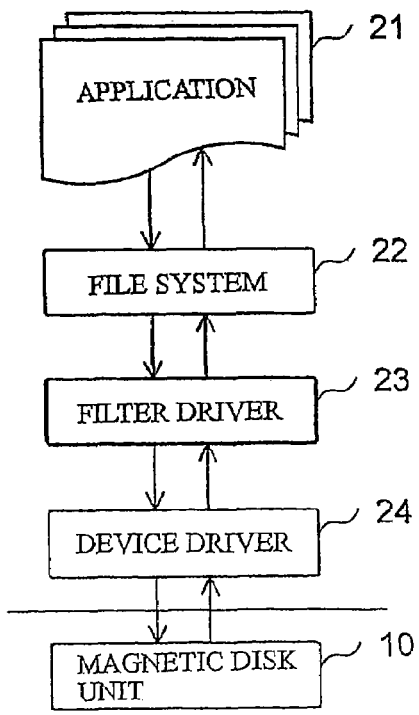

[Figure 3]
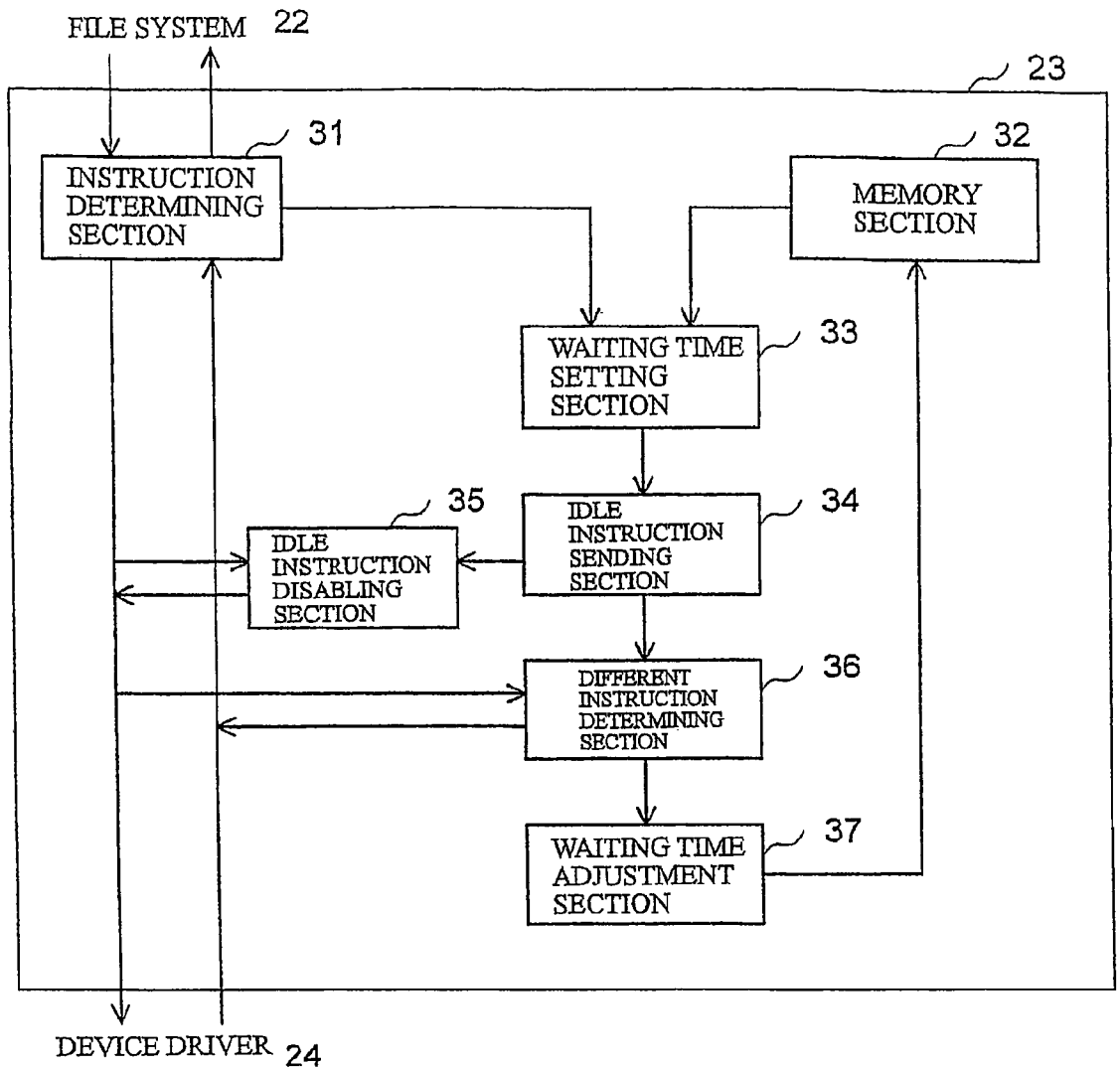
[Figure 4]
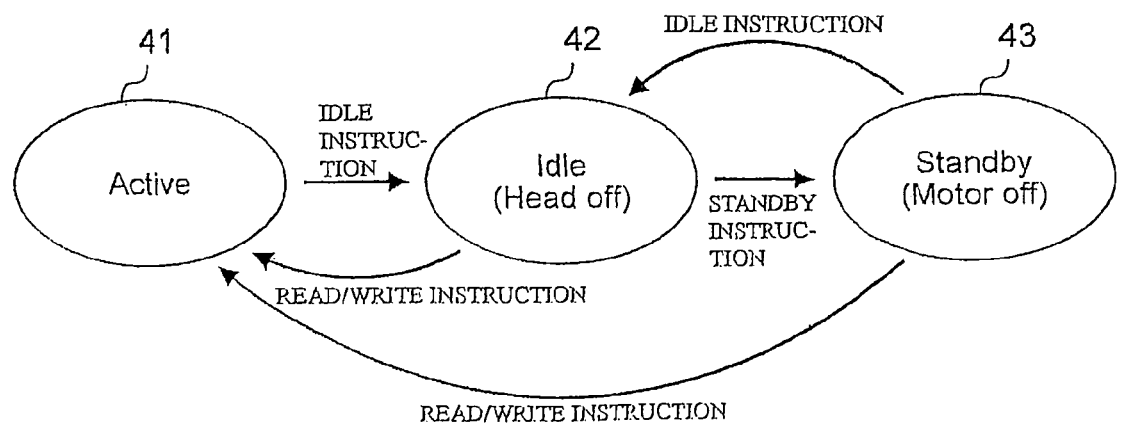

[Figure 5]
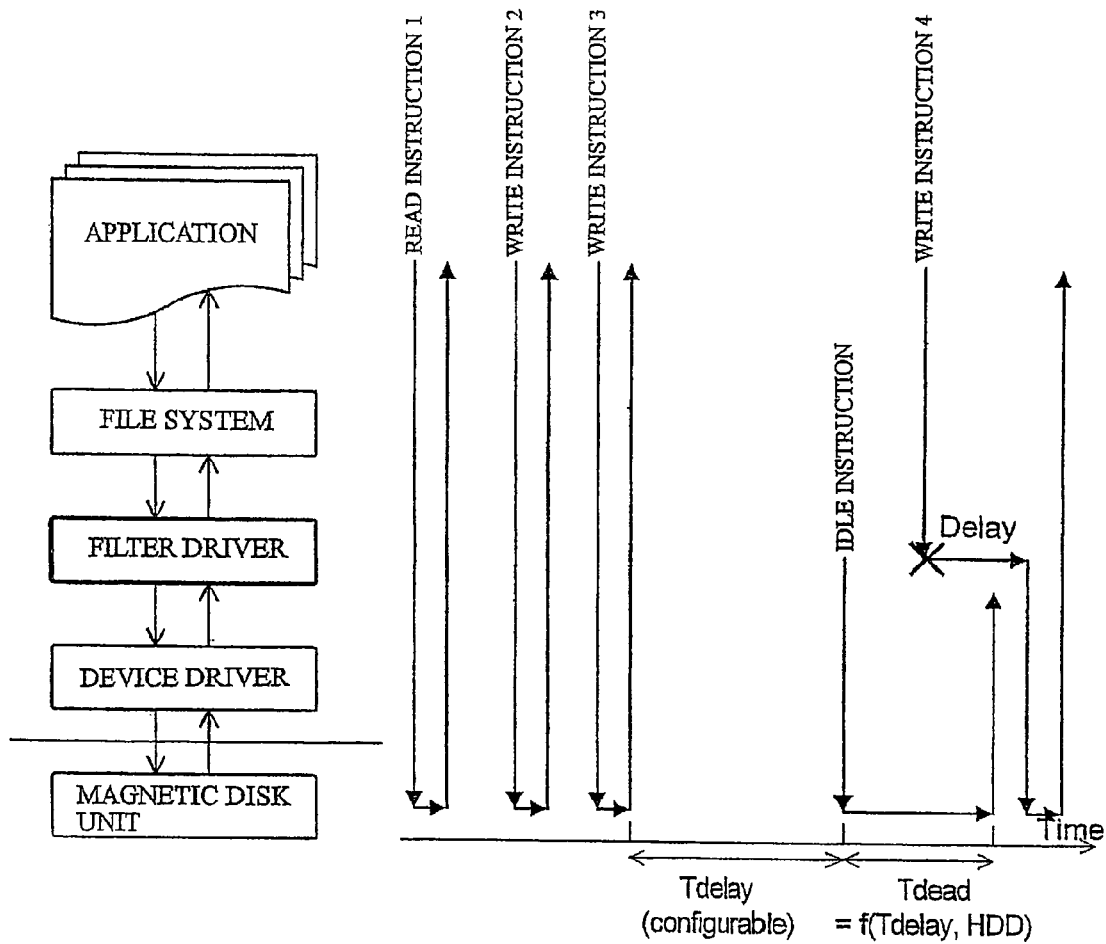

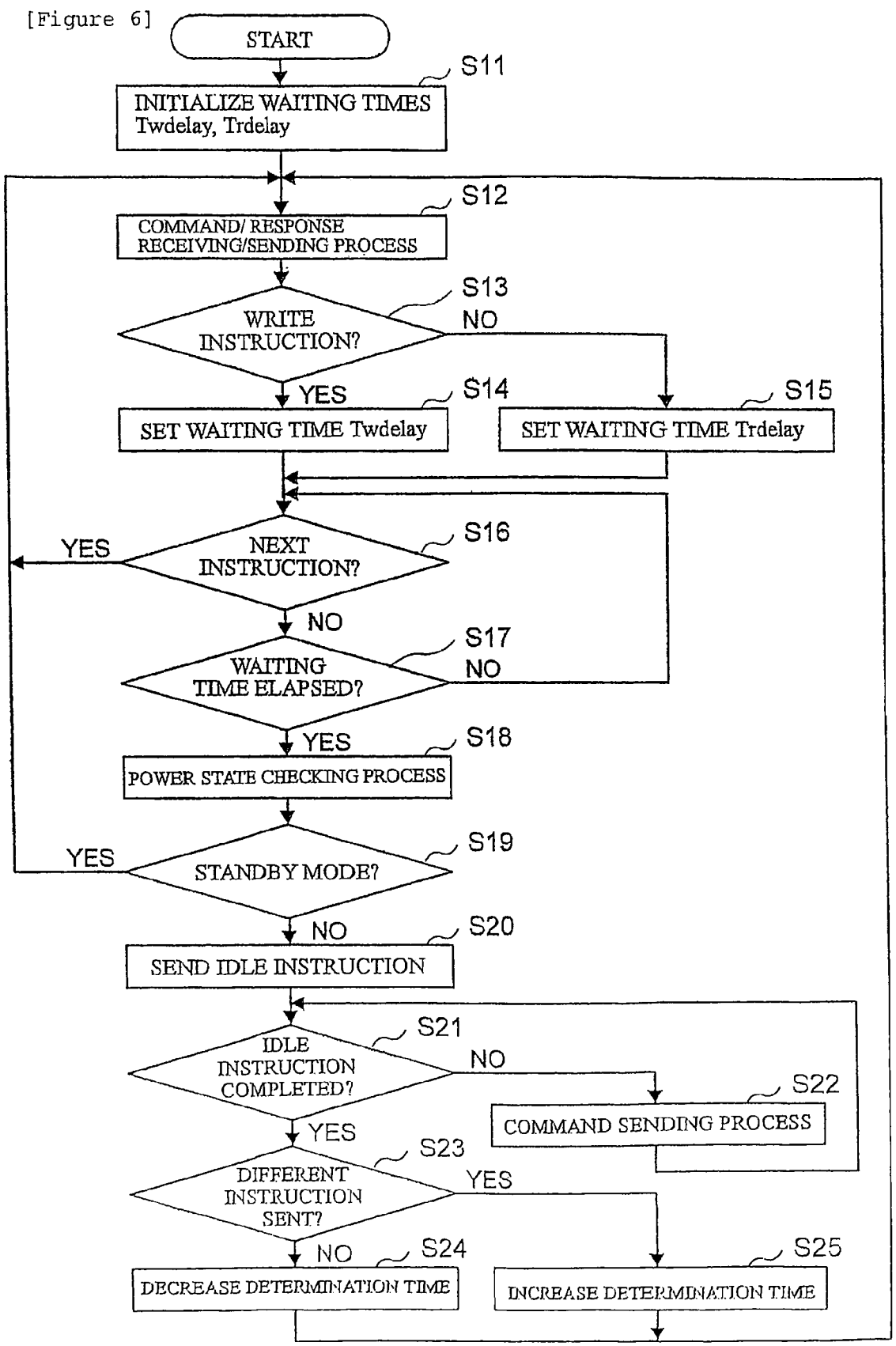
[Figure 6]

[Figure 7]
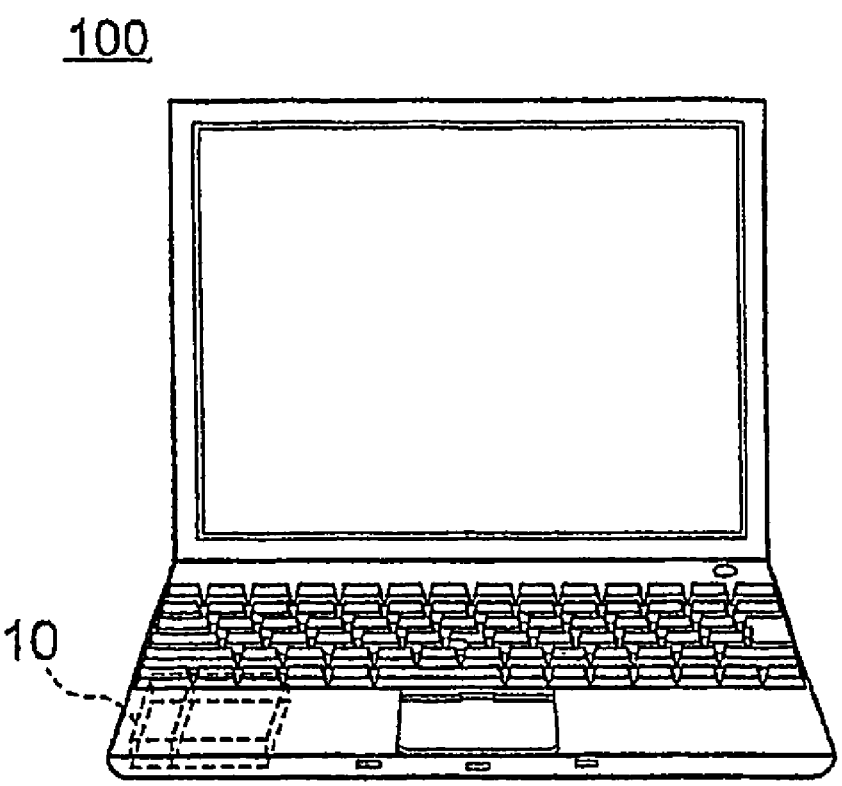

METHOD, PROGRAM AND APPARATUS FOR POWER CONTROL THROUGH AN ELECTRONIC INFORMATION DEVICE IN A MAGNETIC DISK UNIT

PRIORITY CLAIM

This application claims priority of Japanese patent application No. JP 2004-364738, filed on Dec. 16, 2004, and entitled, "Power control method, program, power control apparatus and an electronic information device for magnetic disk unit."

BACKGROUND OF THE INVENTION

1. Technical Field

The present invention relates to power control. More particularly, the present invention relates to a method, a program and an apparatus for power control of a magnetic disk unit through an electronic information device provided with the power control apparatus.

2. Description of the Related Art

Conventionally, a magnetic disk unit such as a hard disk drive has been used as auxiliary equipment of an electronic information device, such as a computer. Such a disk device has multiple power consumption configurations and lowers its power consumption by appropriately switching configurations. The multiple power consumption configurations are different in terms of processing time between receipt and completion of a write instruction or a read instruction. The processing times include a time necessary to perform an instruction to shift into a particular configuration for low power consumption, a time necessary to perform a configuration shift in response to a write instruction or a read instruction (to allow performance of the instruction), and a time necessary to perform an instruction after shifting configurations. Therefore, it is necessary to appropriately switch configurations so as not to increase the processing time.

One prior-art power consumption control technique involves a power consumption timer that is provided in an information processing apparatus. In that technique, a set value of the power consumption timer is adaptively changed such that power consumption is reduced without compromising the throughput of the information processing apparatus. The information processing apparatus can be placed in power saving mode after a set time in the power consumption timer has elapsed. If a task resume request is issued within a configurable time after the information processing apparatus enters power saving mode, the set time in the power consumption timer is increased to prevent subsequent unnecessary entry into power saving mode.

The technology described above changes the power consumption timer according to the transition time between (low-power consumption) power saving mode and operational mode and according to the elapsed time required for completion of processing. However, in the prior art, the elapsed time before a transition to low-power consumption mode is determined is not taken into consideration. In particular, if the time required for the apparatus transitions to low-power consumption mode varies depending on situations at the time of transition, the value of the timer can be improperly set in some situations, and thus can reduce the throughput of the apparatus.

What is needed is a method to provide a power control for a magnetic disk unit that performs mode switching in a manner proper to the situation at transition to low-power consumption mode so that power consumption is efficiently reduced without decreasing the throughput of the magnetic disk unit.

SUMMARY OF THE INVENTION

A power control method for a magnetic disk unit is disclosed. The method includes identifying a type of a last instruction sent to a magnetic disk unit and, in response to identifying the type, setting a wait time that varies according to the type. In response to the wait time having elapsed after a completion of processing ordered by the last instruction, an idle instruction is sent to the magnetic disk unit for placing the magnetic disk unit in an idle state in which power consumption is reduced.

BRIEF DESCRIPTION OF THE DRAWING

FIG. 1 depicts a block diagram showing a configuration of an information processing unit, to which a power control apparatus according to an embodiment of the present invention is applicable;

FIG. 2 illustrates a diagram showing a configuration of a host computer, to which the power control apparatus of a magnetic disk unit according to a preferred embodiment of the present invention;

FIG. 3 depicts a diagram showing a functional configuration of a filter driver in accordance with a preferred embodiment of the present invention;

FIG. 4 illustrates a state transition diagram showing power use modes of the magnetic disk unit in accordance with a preferred embodiment of the present invention;

FIG. 5 depicts a graph of a time-series flow for processing of an instruction in an information processing unit in accordance with a preferred embodiment of the present invention;

FIG. 6 illustrates a high-level logical flowchart of a process for power control of the magnetic disk unit in accordance with a preferred embodiment of the present invention; and FIG. 7 shows an appearance of a personal computer as an example of an information processing unit in accordance with a preferred embodiment of the present invention.

DETAILED DESCRIPTION OF A PREFERRED EMBODIMENT

In a first embodiment of the present invention, a power control method for a magnetic disk unit is disclosed. The method includes determining whether an instruction sent to the magnetic disk unit is a read instruction or a write instruction and setting a waiting time that varies depending on the type of the instruction determined. An idle instruction is sent to the magnetic disk unit for placing the magnetic disk unit in an idle state in which power consumption is low, if the waiting time has elapsed after the completion of processing of the sent instruction by the magnetic disk unit.

In an alternative embodiment of the present invention, a program for causing a computer to determine whether an instruction sent to the magnetic disk unit is a read instruction or a write instruction and setting a waiting time that varies depending on the type of the instruction determined is disclosed. The program then sends an idle instruction to the magnetic disk unit for placing the magnetic disk unit in an idle state in which power consumption is low, if the waiting time has elapsed after the completion of processing of the sent instruction by the magnetic disk unit.

In another alternative embodiment of the present invention, a power control apparatus for a magnetic disk unit is disclosed. The apparatus includes an instruction determining section for determining whether an instruction just sent to the magnetic disk unit is a read instruction or a write instruction and a memory section for storing waiting times that differ according to the type of the instruction. A waiting time setting section for reading a waiting time according to the determination by the instruction determining section from the memory section and setting the waiting time is included, as is an idle instruction sending section for sending an idle instruction to the magnetic disk unit for placing the magnetic disk unit in an idle state in which power consumption is low, if the waiting time set by the waiting time setting section has elapsed after the completion of processing of the sent instruction by the magnetic disk unit.

In still another embodiment of the present invention, an electronic information device including a magnetic disk unit and the power control apparatus is disclosed.

When an idle instruction is sent to the magnetic disk unit if a waiting time has elapsed, the waiting time varies depending on the type of the just sent instruction. With this configuration, the present invention can effectively cut down power consumption by setting the waiting time which varies depending on the just sent instruction without lowering processing throughput of the magnetic disk unit.

FIG. 1 is a block diagram showing a configuration of an information processing unit 100, to which a power control apparatus according to an embodiment of the present invention is applied. The information processing unit 100 includes a magnetic disk unit (HDD) 10 as a storage device and a host computer (a CPU and memory) 20 for controlling the magnetic disk unit 10. The host computer 20 includes realized by a CPU for data processing and a main memory. The magnetic disk unit 10 and the host computer 20 are connected with each other via a bus, such as a serial ATA (AT Attachment) bus (SATA bus).

The magnetic disk unit 10 includes a hard disk drive 12 (HDD 12) with a built-in magnetic disk with input/output behavior conforming to the specifications of a parallel ATA (PATA) and a SATA-PATA bridge 11 for connecting the HDD 12 with an SATA bus of the host computer 20.

SATA-PATA bridge 11 converts instructions (including a write instruction, a read instruction, an idle instruction and a standby instruction) sent by the host computer 20 via the SATA bus and accompanying data into instructions conforming to PATA specifications and sends them to HDD 12 via the PATA bus. SATA-PATA bridge 11 also converts responses to the instructions sent by HDD 12 via the PATA bus and accompanying data into instructions conforming to SATA specifications and sends them to the host computer 20 via the SATA bus. When SATA-PATA bridge 11 receives an idle instruction from host computer 20, it not only sends the instruction to HDD 12 but also stops driving SATA bus to lower power consumption. The idle instruction is, for example, an 'Idle Immediate' command in the ATA.

HDD 12 is typically provided with cache memory to improve the speed in responding to host computer 20 by temporally saving data, which is to be written into a magnetic disk, in high-speed cache memory (write cache) before writing the data into the magnetic disk. Usually, when a disk device shifts from an active state into an idle state or a standby state, in which power consumption is low, the state shift would be completed after HDD 12 writes data (Dirty Data) saved in the cache memory in the magnetic disk and flashes (empties) the cache memory. If the dirty data remains in the cache memory of HDD 12 when an idle instruction is sent from host computer 20 to magnetic disk 10, the process corresponding to the next instruction has to be suspended until the cache is flashed and the idle instruction has processed. Thus, the next instruction cannot be processed immediately. Therefore, a scheme for reducing the frequency transmission of instructions during the suspension, while effectively sending an idle instruction, is needed.

FIG. 2 is a diagram showing a configuration of host computer 20, to which the power control apparatus for magnetic disk unit 10 is applied in accordance with a preferred embodiment of the present invention. Host computer 20 includes an application 12 for performing various types of specific processes, a file system 22 provided by an operating system (OS), a filter driver 23 as a power control apparatus for magnetic disk unit 10 and a device driver 24 for controlling operation of magnetic disk unit 10. The respective functions of host computer 20 are realized by a CPU controlled by instructions from programs. Programs for realizing the functions by controlling a CPU are provided on a magnetic disk, an optical disk, semiconductor memory or the other storage devices, or provided via a network. Then, programs are stored in magnetic disk unit 10, read into memory of host computer 20 and executed by the CPU to realize the functions of respective components shown in FIG. 2.

When application 21 accesses (reads from or writes to) magnetic disk unit 10, it usually accesses the unit via file system 22 provided by an OS. File system 22 manages how a data file composed as a piece of data is actually disposed and stored in magnetic disk unit 10, and hides the disposition from application 21 so as to simplify the usage of magnetic disk unit 10 by application 21. It is device driver 24 that actually accesses magnetic disk unit 10.

Device driver 24, which controls operation of magnetic disk unit 10, connects with magnetic disk unit 10 according to an interface protocol, such as a SATA, which is used when magnetic disk unit 10 connects with the host computer. Device driver 24 accesses an I/O controller (for example, an ATA controller), to which magnetic disk unit 10 is connected under the control file system 22. Then, device driver 24 operates a predetermined I/O port of the I/O controller so that magnetic disk unit 10 can transfer data at a high speed under direction of file system 22.

Filter driver 23 is provided between file system 22 and device driver 24, usually acting as intermediary between interfaces of file system 22 and device driver 24. Specifically, filter driver 23 sends a write instruction or a read instruction sent from file system 22 as a direction or accompanying data sent from file system 22 to device driver 24, and sends a response sent from device driver 24 as a result of processing the instruction by magnetic disk unit 10 or accompanying data to the file system 22. In addition, filter driver 23 sends an idle instruction for placing magnetic disk unit 10 into idle state to magnetic disk unit 10 via device driver 24.

FIG. 3 is a diagram showing a functional configuration of filter driver 23. Filter driver 23, as a power control apparatus of magnetic disk unit 10 includes an instruction determining unit 31, a memory unit 32, a waiting time setting unit 33, an idle instruction sending unit 34, an idle instruction disabling unit 35, a different instruction determining unit 36 and a waiting time adjustment unit 37. The functions of the filter driver 23 are realized by a CPU controlled by programs, respectively.

Instruction determining unit 31 acts as intermediary between interfaces of file system 22 and device driver 24. Specifically, the instruction determining unit 31 sends a write instruction, a read instruction sent from file system 22 as a direction or accompanying data to device driver 24, and sends a response sent from device driver 24 as a result of processing the instruction by magnetic disk unit 10 or accompanying data to file system 22. In addition, instruction determining unit 31 determines whether the instruction just sent to magnetic disk unit 10 is a read instruction or a write instruction.

The storing unit 32, which is embodied as rewritable semiconductor memory included in host computer 20, stores waiting times that vary depending on the type of the instruction which the instruction determining unit 31 receives from file system 22 and sends to device driver 24. Specifically, storing unit 32 stores the write waiting time Twdelay and the read waiting time Trdelay.

Wait time setting unit 33 monitors time by reading a wait time according to determination of instruction determining unit 31 from the memory unit 32 and setting a time to be monitored. Specifically, when instruction determining unit 31 determines that the sent instruction is a read instruction, wait time setting unit 33 reads the read wait time Trdelay from memory unit 32 and sets it as a time to be monitored. When instruction determining unit 31 determines that the sent instruction is a write instruction, the wait time setting unit 33 reads the write waiting time Twdelay from memory unit 32 and sets it as a time to be monitored. Wait time setting unit 33 also starts monitoring after the magnetic disk unit responds to the instruction and determines whether the set waiting time has elapsed or not. Filter driver 23 monitors time by comparing a value of elapsed time to read waiting time Tredelay or comparing a value of elapsed time to write waiting time Twdelay in the memory unit 32 by either subtracting the time or using a time watching service provided by the OS of host computer 20.

If the waiting time set by the wait time setting unit 33 has elapsed after the completion of processing of the instruction, idle instruction sending unit 34 sends an idle instruction for placing magnetic disk unit 10 into an idle state, in which power consumption is low to magnetic disk unit 10.

If magnetic disk unit 10 is in the standby state in which power consumption is lower than the idle state, idle instruction disabling unit 35 disables idle instruction sending unit 34 to prevent sending of the idle instruction.

Alternate instruction determining unit 36 determines whether a different instruction is sent to magnetic disk unit 10 after idle instruction sending unit 34 sent an idle instruction until magnetic disk unit 10 completes the processing of the idle instruction. Alternate instruction determining unit 36 can also perform this determination by determining whether instruction determining unit 31 received an instruction from file system 22.

Waiting time adjustment unit 37 adjusts read waiting time Trdelay or write waiting time Twdelay stored in memory section 32 on the basis of the determination of alternate instruction determining unit 36. For example, if alternate instruction determining unit 36 determines that a different instruction is sent (after the idle instruction was sent but before the completion of the processing of the instruction), wait time adjustment unit 37 increases a value of the read waiting time Trdelay or the write waiting time Trdelay stored in memory unit 32. If it is determined that an alternate instruction is not sent, wait time adjustment unit 37 decreases a value of the read waiting time Trdelay or the write waiting time Twdelay stored in memory unit 32. When a state of host computer 20 is reset by reason of exchanging magnetic disk unit 10 of information processing unit 100 or a similar system event, the wait time adjustment unit 37 initializes the wait time of memory section 32. Specifically, wait time adjustment unit 37 writes a value corresponding to 100 mS as the read waiting time Trdelay and a value corresponding to 500 mS as the write waiting time Twdelay, for example, in memory unit 32 as initial values.

FIG. 4 is a state transition diagram showing a state of power consumption of magnetic disk unit 10. Magnetic disk unit 10 has multiple states with different electric consumptions. For example, an ATA has four states (modes): ACTIVE, IDLE, STANDBY and SLEEP. The ACTIVE state 41, which consumes the most power of the four states, allows an instruction from host computer 20 to be immediately processed. The IDLE state 42 stops motion of the head for reading or writing data to or from the magnetic disk and stops driving of the SATA bus connecting with the host computer, and requires time to start processing of the instruction. The STANDBY state 43 stops turning of the magnetic disk, and requires more time to start the processing of the instruction than the IDLE state 42. Power consumption decreases as the states shift from the ACTIVE state to the IDLE state and to the STANDBY state. The SLEEP state consumes yet less power, because neither write instruction nor read instruction can be received.

If magnetic disk unit 10 receives an idle instruction in ACTIVE state 41 or STANDBY state 43, it enters into IDLE state 42. If magnetic disk unit 10 receives a standby instruction in IDLE state 42, it enters into STANDBY state 43. If magnetic disk unit 10 receives a read instruction or a write instruction in STANDBY state 43 or IDLE state 42, it enters into ACTIVE state 41. Some magnetic disk units enter into the IDLE state by stopping motion of the head without receiving an idle instruction. Even in this case, when magnetic disk unit 10 receives an idle instruction, it suspends operation of a SATA bus and enters into the IDLE state, in which power consumption is reduced.

When magnetic disk unit 10 receives an idle instruction, it shifts from either ACTIVE state 41 or STANDBY state 43 into IDLE state 42. With filter driver 23, when magnetic disk unit 10 is in STANDBY state 43, idle instruction disabling unit 35 disables idle instruction sending unit 34 from sending an idle instruction. Therefore, the present invention sends an idle instruction so as to prevent power consumption from being increased due to shifting from the STANDBY state further to the IDLE state in which power consumption is higher.

FIG. 5 is a graph showing a time-series flow of processing of an instruction in magnetic disk unit 10. The abscissa indicates time passage and the ordinate indicates a hierarchical structure of application 21, file system 22, filter driver 23, device driver 24 and magnetic disk unit 10.

In FIG. 5, a read instruction 1, generated in response to execution of application 21, is sent to magnetic disk unit 10 via file system 22, filter driver 23 and device driver 24. In magnetic disk unit 10 in the ACTIVE state, reading of data corresponding to read instruction 1 is performed. When the process is completed, magnetic disk unit 10 sends the read data to application 21 via device driver 24, filter driver 23 and file system 22 as a response to read instruction 1. With this response, filter driver 23 can detect the completion of the instruction. The flow of process is the same following write instruction 2 and write instruction 3.

Filter driver 23 transfers the response to the instruction to file system 22, and then starts monitoring elapsed time. If wait time Tdelay has elapsed, filter driver 23 sends an idle instruction to magnetic disk unit 10. In magnetic disk unit 10, the SATA-PATA bridge 11 transfers the idle instruction to HDD 12, while stopping driving of the SATA bus for decreasing power consumption. Accordingly, HDD 12 also enters into the IDLE state, but HDD 12 does not start processing a different instruction, even if it receives an instruction, until processing of the idle instruction is completed and HDD 12 enters into the IDLE state. Therefore, even if write instruction 4, a different instruction, is sent to magnetic disk unit 10, the process is suspended until the completion of shifting into the IDLE state.

The relationship between the waiting time Tdelay and the suspending time Tdead is represented below, where a time period after magnetic disk unit 10 receives an idle instruction until it completes shifting into the IDLE state and responds to the filter driver 23, i.e., a time period after it receives a different instruction but before processing of the instruction, is referred to as the suspending time Tdead.

TABLE 1

After Write Command

| Tdelay [msec] | Tdead [msec] |
|---|---|
| 0 | 400 |
| 100 | 700 |
| 200 | 600 |
| 500 | 300 |
| 1000 | 2 |

TABLE 2

After Read Command

| Tdelay [msec] | Tdead [msec] |
|---|---|
| 0 | 20 |
| 100 | 0.3 |
| 200 | 0.3 |
| 500 | 2 |
| 1000 | 2 |

As shown in the tables above, the suspension time Tdead tends to be reasonably short if wait time Tdelay is set to an appropriately long time. Suspension time Tdead varies, depending on whether an idle instruction is issued after a write instruction or after a read instruction, i.e., whether an instruction received just before the idle instruction is a write instruction or a read instruction. The variation may be caused by the fact that, if an idle instruction is received when the instruction immediately before is a write instruction, the shifting of the states completes after HDD 12 of magnetic disk unit 10 writes data saved in the built-in cache memory to the magnetic disk and flashes the cache memory. Suspension time Tdead shown in the tables above also varies depending on the type of magnetic disk unit 10. When filter driver 23 sends an idle instruction to the magnetic disk unit on the condition that a waiting time has elapsed, it adjusts the waiting time depending on whether a different instruction is sent until the completion of the process of the idle instruction, considering that the waiting time varies depending on the instruction just sent. As a result, the present invention can effectively cut down power consumption without lowering the throughput of magnetic disk unit 10 by appropriately adjusting the waiting time according to the processing time of magnetic disk unit 10, which varies depending on the instruction just sent.

FIG. 6 is a flowchart showing a process for power control in accordance with a preferred embodiment of the present invention.

First, a state within host computer 20 is reset in response to an exchange of magnetic disk unit 10 within information processing unit 100. For example, when the process starts, wait time adjustment unit 37 initializes the wait time Tdelay (S11). For example, wait time adjustment unit 37 writes a value corresponding to 100 mS as the read wait time Trdelay and a value corresponding to 500 mS as the write wait time Twdelay in the memory unit 32.

Next, instruction determining unit 31 performs command/response receiving/sending process (S12). Specifically, instruction determining unit 31 sends a write instruction, a read instruction or accompanying data sent from file system 22 to device driver 24, or sends a response or accompanying data sent from device driver 24 as a result of processing of an instruction by magnetic disk unit 10 to file system 22.

Next, instruction determining unit 31 determines whether the instruction just sent to the magnetic disk unit is a read instruction or a write instruction (S13). If a write instruction is identified (S13: YES), step S14 is performed. If a read instruction is identified (S13: NO), step S15 is performed.

Next, wait time setting unit 33 sets a wait time, which varies depending on the determination of the type of instruction (S14, S15). Specifically, at step 14, which is performed when a write instruction is identified, the wait time setting unit 33 reads write waiting time Twdelay from memory unit 32 and sets it as a monitoring period. At step 15, which is performed when a read instruction is identified, the wait time setting unit 33 reads the read wait time Trdelay from the memory unit 32 and sets it as a monitoring period. After step 14 or step 15, step S16 is performed.

Then, the instruction determining unit 31 determines whether it has received a next instruction or not. If it determines that a next instruction is sent from file system 22 (S16: YES), the instruction determining unit 31 returns to step S12 to monitor a wait time.

If it is determined that it does not have the next instruction at step S16 (S16: NO), wait time setting unit 33 determines whether the set wait time has elapsed (S17). If it is determined that the wait time has not elapsed (S17: NO), the wait time setting unit 33 returns to step S16 to continue monitoring elapsed time. If it is determined that the set wait time has elapsed after the completion of the instruction just sent by magnetic disk unit 10 (S17: YES), the idle instruction disabling unit 35 performs power state checking process (S18). If it is determined that magnetic disk unit 10 is in the standby state, in which power consumption is lower than that of the idle state (S19: YES), the operation returns to step S12. In this manner, the present invention can disable sending of an idle instruction by idle instruction sending unit 34.

If it is determined that magnetic disk unit 10 is not in the STANDBY state at step S19 (S19: NO), idle instruction sending unit 34 sends an idle instruction for shifting magnetic disk unit 10 into the IDLE state to the magnetic disk unit 10 (S20).

Then, alternate instruction determining unit 36 determines whether magnetic disk unit 10 has completed the idle instruction (S21). If it is determined that the idle instruction has not been completed (S21: NO), instruction determining unit 31 repeats the command receiving/sending process (S22).

If it is determined that the process of idle instruction has been completed (S21: YES), alternate instruction determining unit 36 determines whether an alternate instruction is to be sent to magnetic disk unit 10 until the completion of the idle instruction (S23). Based on the determination, wait time adjustment unit 37 adjusts the read wait time Trdelay or the write wait time Twdelay stored in memory unit 32 (S24, S25). Specifically, at step S25, which is performed when it is determined that an alternate instruction is to be sent, wait time adjustment unit 37 increases a value of read wait time Trdelay or write wait time Twdelay stored in memory unit 32 (S25). If it is determined that an alternate instruction is not to be sent, wait time adjustment unit 37 decreases a value of read wait time Trdelay or write wait time Twdelay stored in memory unit 32 (S24). The wait time adjustment unit 37 changes only the wait time set by wait time setting unit 33 according to the determination about the type of the instruction from read wait time Trdelay and the write wait time Twdelay. As the read wait time Trdelay and the write wait time Twdelay are adjusted separately in this manner (S24, S25), the optimal wait time can be set according to the processing time of the idle instruction, which varies depending on the type of the instruction received immediately prior to setting.

If an alternate instruction is sent during the processing of an idle instruction, the present invention can prevent lowering of the throughput of magnetic disk unit 10 by increasing a value of read wait time Trdelay or write wait time Twdelay to reduce suspension time Tdead of magnetic disk unit 10 and lower probability that a different command is sent during the processing of the idle instruction. If an alternate instruction is not sent during the processing of the idle instruction, the present invention can further cut power consumption by decreasing a value of read wait time Trdelay or write wait time Twdelay for reducing the waiting time until magnetic disk unit 10 enters into the IDLE state.

Information processing unit 100 applies filter driver 23 according to the above mentioned embodiments. FIG. 7 shows an appearance of a personal computer as an example of the information processing unit 100 applying filter driver 23. The information processing unit 100 has magnetic disk unit 10 and a built-in filter driver 23. With this configuration, the present invention can effectively cut down power consumption without lowering the throughput by setting the optimal waiting time according to a processing time depending on the instruction just sent to magnetic disk unit 10.

The present invention is not limited to the abovementioned embodiments and can include modifications and improvements within the range in which the objects of the present invention can be achieved.

For example, although it has been described that magnetic disk unit 10 and host computer 20 are connected with each other via a SATA bus and magnetic disk unit 10 includes a SATA-PATA bridge 11 for connecting HDD 12 under the input/output specifications of PATA to the SATA bus, the present invention is not limited to this configuration and can have the configuration where a host computer is directly connected with a HDD. Specifications of the connection between magnetic disk unit 10 and host computer 20 are not limited to SATA or PATA, and can be any specifications if supporting transfer of an idle instruction.

While the invention has been particularly shown and described with reference to a preferred embodiment, it will be understood by those skilled in the art that various changes in form and detail may be made therein without departing from the spirit and scope of the invention.

What is claimed is:

1. A power control method for a magnetic disk unit, said method comprising:
   identifying a type of a last instruction sent to a magnetic disk unit;
   in response to identifying said type, setting a wait time that varies according to said type; and
   in response to said wait time having elapsed after a completion of processing ordered by said last instruction, sending an idle instruction to said magnetic disk unit for placing said magnetic disk unit in an idle state in which power consumption is reduced.

2. The power control method of claim 1, further comprising the steps of:
   determining that said magnetic disk unit is not in a standby state in which power consumption is lower than said idle state; and
   in response to determining that said magnetic disk unit is in a standby state in which power consumption is lower than said idle state, enabling a sending unit to send said idle instruction.

3. The method of claim 1, wherein said step of setting a wait time that varies according to said type further comprises:
   setting said wait time to a first value in response to a write instruction; and
   setting said wait time to a second value in response to a read instruction.

4. The method of claim 1, further comprising the step of determining whether said idle instruction has reached a completion.

5. The method of claim 4, further comprising the step of determining whether an alternate instruction for said magnetic disk unit is sent during the time between sending said idle instruction and said completion of said idle instruction.

6. The method of claim 5, further comprising the step of determining whether an alternate instruction for said magnetic disk unit is sent during the time between sending said idle instruction and completion of said idle instruction.

7. The method of claim 6, further comprising the step of increasing said wait time in response to sending said alternate instruction.

8. A power control system for a magnetic disk unit, said system comprising:
   means for identifying a type of a last instruction sent to a magnetic disk unit;
   means for, in response to identifying said type, setting a wait time that varies according to said type; and
   means for, in response to said wait time having elapsed after a completion of processing ordered by said last instruction, sending an idle instruction to said magnetic disk unit for placing said magnetic disk unit in an idle state in which power consumption is reduced.

9. The power control system of claim 8, further comprising:
   means for determining that said magnetic disk unit is not in a standby state in which power consumption is lower than said idle state; and
   means for, in response to determining that said magnetic disk unit is in a standby state in which power consumption is lower than said idle state, enabling a sending unit to send said idle instruction.

10. The system of claim 8, wherein said means for setting a wait time that varies according to said type further comprises:
    means for setting said wait time to a first value in response to a write instruction; and
    means for setting said wait time to a second value in response to a read instruction.

11. The system of claim 8, further comprising means for determining whether said idle instruction has reached a completion.

12. The system of claim 11, further comprising means for determining whether an alternate instruction for said magnetic disk unit is sent during the time between sending said idle instruction and said completion of said idle instruction.

13. The system of claim 12, further comprising means for determining whether an alternate instruction for said magnetic disk unit is sent during the time between sending said idle instruction and completion of said idle instruction.

14. The system of claim 13, further comprising means for increasing said wait time in response to sending said alternate instruction.

15. A machine-readable medium having a plurality of instructions processable by a machine embodied therein, wherein said plurality of instructions, when processed by said machine, causes said machine to perform a method for power control for a magnetic disk unit, said method comprising:

identifying a type of a last instruction sent to a magnetic disk unit;

in response to identifying said type, setting a wait time that varies according to said type; and in response to said wait time having elapsed after a completion of processing ordered by said last instruction, sending an idle instruction to said magnetic disk unit for placing said magnetic disk unit in an idle state in which power consumption is reduced.

16. The machine-readable medium of claim 15, said method further comprising the steps of:

determining that said magnetic disk unit is not in a standby state in which power consumption is lower than said idle state; and in response to determining that said magnetic disk unit is in a standby state in which power consumption is lower than said idle state, enabling a sending unit to send said idle instruction.

17. The machine-readable medium of claim 15, wherein said step of setting a wait time that varies according to said type further comprises:

setting said wait time to a first value in response to a write instruction; and setting said wait time to a second value in response to a read instruction.

18. The machine-readable medium of claim 15, said method further comprising the step of determining whether said idle instruction has reached a completion.

19. The machine-readable medium of claim 18, said method further comprising the step of determining whether an alternate instruction for said magnetic disk unit is sent during the time between sending said idle instruction and said completion of said idle instruction.

20. The machine-readable medium of claim 19, said method further comprising the step of determining whether an alternate instruction for said magnetic disk unit is sent during the time between sending said idle instruction and completion of said idle instruction.

* * * * *